US008626927B2

(12) United States Patent
Mazilo (10) Patent No.: US 8,626,927 B2
(45) Date of Patent: Jan. 7, 2014

(54) SYSTEM FOR AND METHOD OF DISTRIBUTING FILES

(75) Inventor: Alexander Mazilo, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 174 days.

(21) Appl. No.: 12/774,900

(22) Filed: May 6, 2010

(65) Prior Publication Data

US 2011/0276618 A1    Nov. 10, 2011

(51) Int. Cl.
*G06F 15/16* (2006.01)

(52) U.S. Cl.
USPC ........... 709/227; 709/201; 709/220; 709/226; 709/248; 717/168; 717/169; 717/171; 717/172

(58) Field of Classification Search
USPC .......... 709/201, 220, 226, 248; 717/168, 169, 717/171, 172
See application file for complete search history.

(56) References Cited

U.S. PATENT DOCUMENTS

| | | | | |
|---|---|---|---|---|
| 4,805,107 A * | 2/1989 | Kieckhafer et al. | ........... | 714/4.3 |
| 5,495,582 A * | 2/1996 | Chen et al. | ..................... | 709/227 |
| 5,758,071 A * | 5/1998 | Burgess et al. | ................ | 709/220 |
| 6,202,067 B1 * | 3/2001 | Blood et al. | .................. | 707/613 |
| 6,640,334 B1 * | 10/2003 | Rasmussen | .................... | 717/171 |
| 6,745,224 B1 * | 6/2004 | D'Souza et al. | .............. | 709/202 |
| 6,874,031 B2 * | 3/2005 | Corbeil | ........................ | 709/229 |
| 7,320,032 B2 * | 1/2008 | Johnson | ........................ | 709/225 |
| 7,334,044 B1 * | 2/2008 | Allen | ............................. | 709/233 |
| 7,551,647 B2 * | 6/2009 | Fellman et al. | ................ | 370/503 |
| 7,644,125 B2 * | 1/2010 | Baynes et al. | ................ | 709/206 |
| 7,693,998 B2 * | 4/2010 | Patiejunas | ..................... | 709/227 |
| 7,801,995 B2 * | 9/2010 | Lake et al. | .................... | 709/226 |
| 7,865,888 B1 * | 1/2011 | Qureshi et al. | ................ | 717/168 |
| 7,894,371 B2 * | 2/2011 | Bonta et al. | ................... | 370/254 |
| 7,966,295 B2 * | 6/2011 | Karlsson | ....................... | 707/655 |
| 7,995,493 B2 * | 8/2011 | Anderlind et al. | ............ | 370/252 |
| 8,059,670 B2 * | 11/2011 | Soni et al. | ..................... | 370/412 |
| 8,200,764 B2 * | 6/2012 | Quinn et al. | ................... | 709/206 |
| 2006/0272025 A1 * | 11/2006 | Mononen | ........................ | 726/26 |
| 2007/0198698 A1 * | 8/2007 | Boyd et al. | .................... | 709/224 |
| 2007/0206566 A1 * | 9/2007 | Bennett | ........................ | 370/352 |
| 2008/0109448 A1 * | 5/2008 | Aboel-Nil et al. | .............. | 707/10 |
| 2009/0113304 A1 * | 4/2009 | Mercier et al. | ................ | 715/719 |
| 2010/0011108 A1 * | 1/2010 | Clark et al. | .................... | 709/227 |
| 2010/0049856 A1 * | 2/2010 | Wright et al. | ................. | 709/227 |
| 2010/0299664 A1 * | 11/2010 | Taylor et al. | ................... | 717/173 |
| 2011/0016531 A1 * | 1/2011 | Yeung et al. | .................... | 726/25 |
| 2011/0078318 A1 * | 3/2011 | Desai et al. | .................... | 709/228 |
| 2011/0321024 A1 * | 12/2011 | Knothe et al. | ................. | 717/168 |

* cited by examiner

*Primary Examiner* — Michael Won (57) ABSTRACT

A system for and method for distributing data to a plurality of work stations is presented. The system and method may include determining reception of new or updated data, initiating a first data distribution session to distribute the new or updated data to a first work station of a plurality of work stations via a communication network, determining whether the first work station of the plurality of work stations is active, determining whether a second data distribution session is in progress, and establishing the first data distribution session with the first work station of the plurality of work stations via the communication network in response to a determination that the second data distribution session is not in progress.

26 Claims, 6 Drawing Sheets

SYSTEM FOR AND METHOD OF DISTRIBUTING FILES

BACKGROUND INFORMATION

As networks became widespread, people saw it as a way of distributing data. But while the average bandwidth capacity is increasing, users around the world are trying to share more data. Although the networks are able to support more bandwidth, they cannot keep up with the rapidly increasing requests of the users. Some of the network configurations are not always suitable for disseminating files of considerable size. Often, networks have to be managed in a very automatic, dynamic, and efficient way. For example, enabling distribution of files may require flexible control, distributed processing, bandwidth sensitivity, conditional processing, auditing and security.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and a process for distributing data to a plurality of work stations via a communication network. For example, the plurality of work stations may be coupled to a data distribution system via the communication network. The data distribution system may distribute data (e.g., application files) to the plurality of work stations via the communication network. In an exemplary embodiment, the data distribution system may distribute data to one work station of the plurality of work stations at a time in order to ensure sufficient bandwidth and processing power for other applications. The data distribution system may maintain a directory of the plurality of work stations. For example, the data distribution system may distribute data to the plurality of work stations sequentially one work station at a time.

The data distribution system may also maintain a data request database for storing data requests transmitted from the plurality of work stations. In an exemplary embodiment, during a data distribution process, a work station may transmit a data request to the data distribution system. The data distribution system may store the data request from the work station in the data request database for later processing. For example, the data distribution system may process the data request stored in the data request database after the completion of the data distribution in progress or when the data distribution system is idle (e.g., not distributing data).

Figure 1:
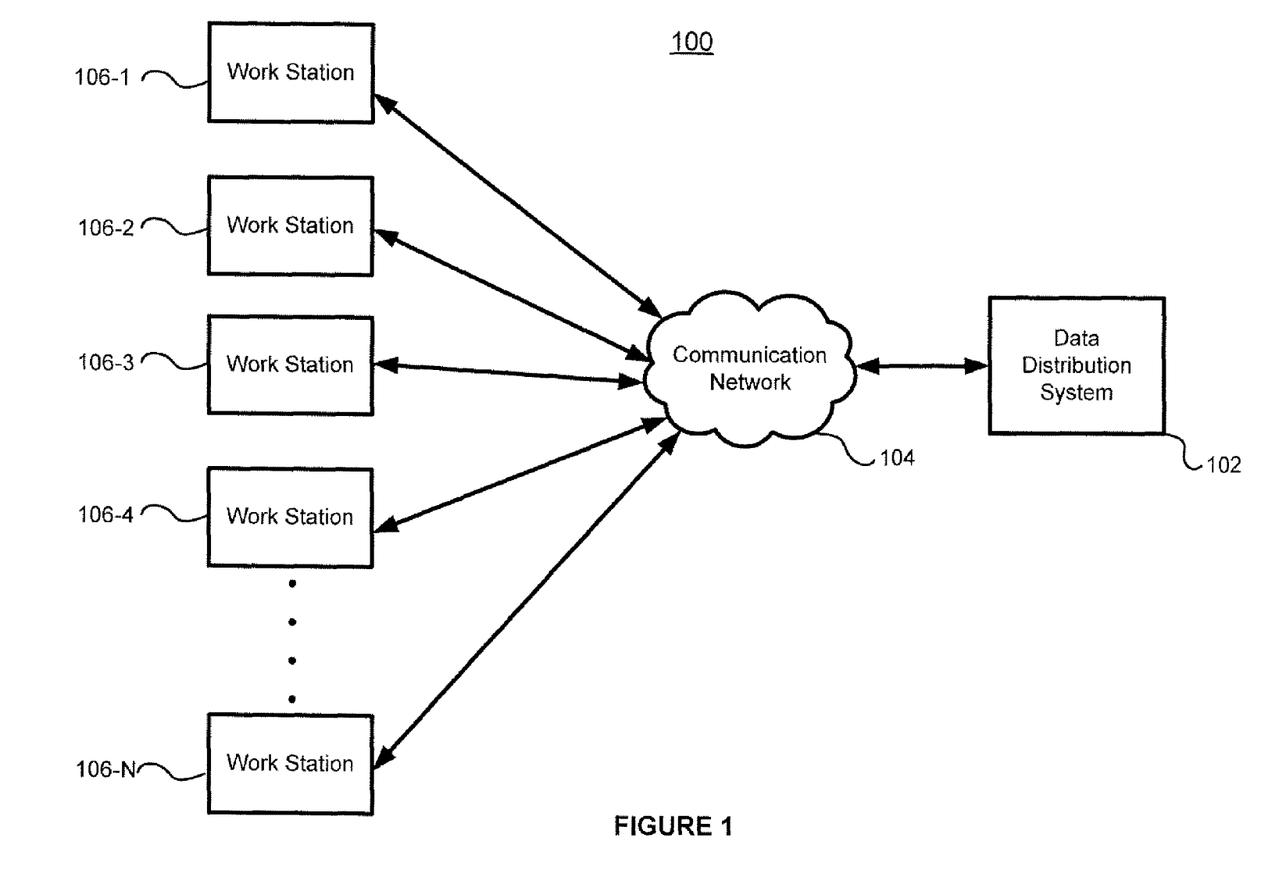
FIG. 1 is a schematic diagram illustrating a distribution system according to a particular embodiment.

FIG. 1 is a schematic diagram illustrating a distribution system according to particular embodiments. As illustrated in FIG. 1, the distribution system 100 may include a data distribution system 102 coupled to a plurality of work stations 106(1-N) via a communication network 104. For example, the data distribution system 102 may distribute data to the plurality of work station 106(1-N) via the communication network 104 sequentially, one work station 106 at a time. In an exemplary embodiment, the data distribution system 102 may receive new or updated data from a user (e.g., administrator) associated with the data distribution system 102 or other systems coupled to the data distribution system 102. The data distribution system 102 may store and copy the new or updated data to be transmitted to the plurality of work stations 106(1-N). In an exemplary embodiment, the data distribution system 102 may transmit the new or updated data to one work station 106 of the plurality of work stations 106(1-N) at a time via the communication network 104. The data distribution system 102 may repeat the data distribution process until all of the plurality of work stations 106(1-N) receive the new or updated data. In another exemplary embodiment, the data distribution system 102 may receive data distribution requests from the plurality of work stations 106(1-N). In the event that a data distribution session is in progress, the data distribution system 102 may store the data distribution requests for later processing. The data distribution system 102 may process the data distribution request when the data distribution session is completed or the data distribution system 102 is idle (e.g., not distributing data).

The data distribution system 102 may include one or more servers. For example, the data distribution system 102 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to establish a data distribution session with a plurality of work stations 106(1-N). Also, the data distribution system 102 may include one or more Internet Protocol (IP) network server or public switch telephone network (PSTN) server. The data distribution system 102 may distribute data to an intended work station 106 of the plurality of work stations 106 via the communication network 104.

The data distribution system 102 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Bluray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The communication network 104 may be coupled to the data distribution system 102 and the plurality of work stations 106(1-N). The communication network 104 may be a wireless network, a wired network or any combination of wireless network and wired network. For example, the communication network 104 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 104 may include, without limitation, telephone line, fiber optics, IEEE Ethernet 802.3, wide area network (WAN), local area network (LAN), or global network such as the Internet. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may comprise a plurality of interconnected networks, such as, for example, a service provider network, the Internet, a broadcaster's network, a cable television network, corporate networks, and home networks.

The work stations 106(1-N) may be a computer, a personal computer, a laptop, a cellular communication device, a workstation, a mobile device, a phone, a handheld PC, a personal digital assistant (PDA), a thin system, a fat system, a network appliance, an Internet browser, or other any other device that may be in communication with the data distribution system 102 via the communication network 104.

Figure 2:
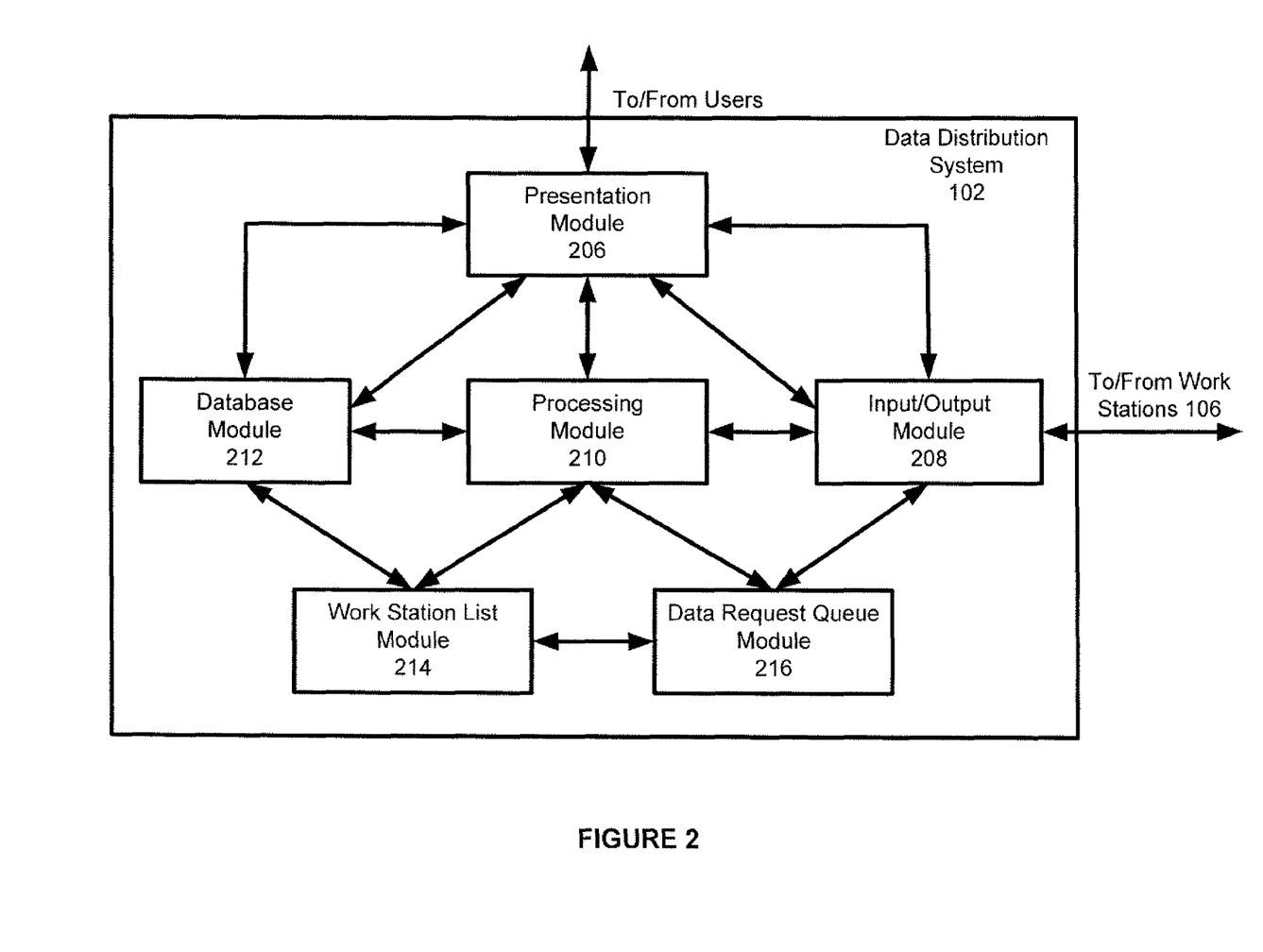
FIG. 2 is a block diagram of a hardware component of the data distribution system of a particular embodiment.

FIG. 2 is a block diagram of a hardware component of the data distribution system 102 of a particular embodiment. The data distribution system 102 may include a presentation module 206, an input/output module 208, a processing module 210, a database module 212, a work station list module 214, or a data request queue module 216. It is noted that the modules 206, 208, 210, 212, 214, and 216 are exemplary and the functions performed by one or more of the modules may be combined with that performed by other modules. The functions described herein as being performed by the modules 206, 208, 210, 212, 214, and 216 also may be separated and may be located or performed by other modules. Moreover, the modules 206, 208, 210, 212, 214, and 216 may be implemented at other devices of the distribution system 100 (e.g., the communication network 104 or the plurality of work stations 106(1-N)).

The input/output (I/O) module 208 may include routers, repeater, antennas, or other transceiver device for transmitting data to and receiving data from the plurality of work stations 106(1-N). For example, the input/output (I/O) module 208 may receive data from the processing module 210 or the database module 212 to be distributed to one of the plurality of work station 106(1-N) during a data distribution session. For example, the database module 212 may receive new or updated data and stored. The processing module 210 may make copies of the new or updated data and provide copies of the new or updated data to the input/output module 208. The input/output (I/O) module 208 may transmit copies of the new or updated data to one of a plurality of work stations 106(1-N) at a time.

The input/output (I/O) module 208 may receive one or more data distribution requests from at least one of a plurality of work stations 106(1-N). For example, the one or more data distribution request may be transmitted via signaling system number #7 (SS7) protocol or session initiation protocol (SIP) in order to establish a data distribution session over the communication network 104. The data distribution request may include information associated with the work station 106 that requests the data distribution session with the data distribution system 102. For example, the data distribution request may include address information associated with the work station 106. In an exemplary embodiment, the address information associated with the work station 106 may include uniform resource identifiers (URI), uniform resource locators (URL), or other identification information to identify the requesting work station 106. The data distribution request may also include data identifier information associated with data requested by the work station 106. In an exemplary embodiment, the data identifier information may include metadata, hash files, automatic number identification (ANI), data name, file format identifiers (FFISs), file header, uniform type identifiers (UTIs), location of data, and other identifiers to locate and identify the requested data for distribution to the requesting work station 106. In another exemplary embodiment, the data distribution request may include a data request header field containing description of the software, hardware, and/or protocols used in establishing a data distribution session. The input/output (110) module 208 may use automatic number identification (ANI) information to process the data distribution requests.

The input/output (I/O) module 208 may preprocess the data distribution requests received from the plurality of work stations 106(1-N) (e.g., filter, sort, format, and aggregate). In an exemplary embodiment, the preprocessing of the data distribution requests received by the input/output (I/O) module 208 may include filtering the data distribution requests and eliminating erroneous or defective data distribution requests, sorting the data distribution requests in accordance with the locations of the work station 106 relative to the data distribution system 102 of the data distribution session (e.g., numbering plan assignment (NPA) information), formatting the data distribution requests into desired format (e.g., identify various segments of the data distribution requests), and aggregating the data distribution requests from the work station 106 to be processed.

The data distribution requests may be transferred from the input/output (I/O) module 208 to the processing module 210 for processing. The processing module 210 may process the data distribution requests to establish a data distribution session with a work station 106 when no other data distribution session is in progress. The processing module 210 may include a processor or a plurality of sub-analytical modules having a processor to establish a data distribution session. For example, the processing module 210 may identify the work station 106 requesting a data distribution session based at least in part on the data distribution request. The processing module 210 may identify address information associated with the requesting work station 106 from the data distribution request. The processing module 210 may provide the address information associated with the request work station 106 to the input/output (I/O) module 208 and instruct the input/output (I/O) module 208 to establish a data distribution session with the requesting work station 106.

In another exemplary embodiment, the processing module 210 may access the database module 212 to identify data to be distributed associated with a data distribution session. For example, the processing module 210 may determine whether another data distribution session is in progress. In the event that no other data distribution session is in progress, the processing module 210 may process the data distribution request. In an exemplary embodiment, the processing module 210 may identify the data identifier information in the data distribution request provided by the work station 106. The processing module 210 may access the database module 212 to identify the requested data to be distributed based at least in part on the data identifier information. For example, the processing module 210 may search the database module 212 to identify the data based at least in part on the data identifier information. The processing module 210 may copy the requested data and provide copy of the requested data to the input/output module 208 to be distributed to the requesting work station 106 in the event that no other data distribution session is in progress. In the event that another data distribution session is in progress, the processing module 210 may transfer the data distribution requests to the data request queue module 216 to be stored and processed at a later time (e.g., when other data distribution session is completed or the data distribution system 102 is idle).

The processing module 210 may access the database module 212 at predetermined periodic intervals. The predetermined periodic intervals may be a second, a minute, a half hour, a hour, a day, a week, a month, a year, or a desired interval. For example, the processing module 210 may periodically access the database module 210 to verify whether new or updated data are stored in the database module 210. In an exemplary embodiment, the processing module 210 may access the database module 212 every half hour to determine whether new or updated data are stored in the database module 212. In the event that the processing module 210 determines that new or updated data are stored in the database module 210, the processing module 210 may access the new or updated data. The processing module 210 may make a copy of the new or updated data and provide copy of the new or updated data to the input/output module 208 to be distributed to one of the plurality of work stations 106(1-N) at a time. The processing module 210 may continue to copy and transmit the new or updated data until all work stations 106 of the plurality of work stations 106(1-N) receive the new or updated data.

The processing module 210 may generate data probing requests for the plurality of work stations 106(1-N). The one or more data probing requests may be transmitted to the plurality of work stations 106(1-N) via the input/output module 208. The one or more data probing requests may include data identifier information associated with data maintained at the data distribution system 102. The data probing requests may also include instruction for the plurality of work stations 106(1-N) to compare data maintained at the work station 106 and data maintained at the data distribution system 102. In an exemplary embodiment, the plurality of work stations 106(1-N) may determine that data maintained at the work station 106 are the same as data maintained at the data distribution system 102. In another exemplary embodiment, the plurality of work stations 106(1-N) may determine that the data maintained at the work station 106 is not the same as the data maintained at the data distribution system 102. The plurality of work stations 106(1-N) may identify data identifier information associated with data maintained at the data distribution system 102 and not maintained at the work station 106.

The plurality of work stations 106(1-N) may process the data probing requests to include comparison results (e.g., same or not same) at the plurality of work stations 106(1-N). In an exemplary embodiment, the plurality of work stations 106(1-N) may add data identifier information associated with data maintained at the data distribution system 102 and not maintained at the work station 106 to the data probing requests. Subsequently, the plurality of work stations 106(1-N) may transmit the processed data probing requests back to the data distribution system 102. The processing module 210 may determine whether data stored at the plurality of work stations 106(1-N) require update based at least in part on the one or more processed data probing requests.

In another exemplary embodiment, the plurality of work stations 106 may process the data probing requests to include data identifier information associated with data maintained at the work station 106. The plurality of work stations 106 may transmit the processed data probing requests back to the data distribution system 102. The processing module 210 may determine whether the work station 106 maintained the same data as the data distribution system 102 by comparing the data stored at the work station 106 with data stored in the database module 212.

In an exemplary embodiment, the processing module 210 may periodically generate one or more data probing requests for the plurality of work stations 106(1-N). For example, the processing module 210 may generate a data probing request every time the work station 106 is coupled to the data distribution system 102 (e.g., turned on, coupled to the communication network 104). In another exemplary embodiment, the processing module 210 may generate data probing requests at predetermined periodic intervals. For example, the processing module 210 may generate data probing request every minute, hour, day, week, month, or year to determine whether the work station 106 maintained the same data as the data distribution system 102.

The presentation module 206 may provide an interface between users associated with the data distribution system 102, the data distribution system 102, and users associated with the plurality of work stations 106(1-N). The presentation module 206 may include a user interface, e.g., a graphical user interface, to receive one or more queries/requests from the user associated with the data distribution system 102 (e.g., administrator) and to provide a data distribution status to the user associated with the data distribution system 102. The presentation module 206 may provide a separate or a unified graphical user interface. The presentation module 206 may include an Application Programming Interface (API) to interact with the plurality of work stations 106(1-N). In an exemplary embodiment, the presentation module 206 may present one or more graphical contents or displays to the user associated with the data distribution system 102 or the user associated with the plurality of work stations 106(1-N) of a status of data distribution progress (e.g., complete, progress bar, percent of distribution complete).

In another exemplary embodiment, the presentation module 206 may receive one or more queries/requests from a plurality of work stations 106(1-N). In response to receiving the one or more queries/requests from a user associated with a work station 106, the presentation module 206 may provide the one or more queries/requests to the input/output (I/O) module 208, the processing module 210, the database module 212, the work station list module 214, and the data request queue module 214. For example, the presentation module 206 may receive one or more queries/requests from the user associated with the work station 106 for a data distribution session to obtain new or updated data. In response to receiving the one or more queries/requests from the user associated with the work station 106, the presentation module 206 may provide the one or more queries/requests to the input/output module 208, the processing module 210, the database module 212, the work station list module 214, and/or the data request queue module 216 to distribute data to the work station 106.

In other exemplary embodiments, the presentation module 206 may receive one or more queries/requests from users associated with the data distribution system 102 to distribute data to the plurality of work stations 106(1-N). For example, a user may provide a request to the presentation module 206 to distribute data to the plurality of work stations 106(1-N). In an exemplary embodiment, a user associated with the data distribution system 102 may provide one or more queries/requests to select one of the plurality of uniform resource identifiers (URIs) or uniform resource locators (URLs) associated with the plurality of work stations 106(1-N). In another exemplary embodiment, a user associated with the data distribution system 102 may provide a request to the presentation module 206 for a status of a data distribution session. In other exemplary embodiments, a user associated with the data distribution system 102 may provide the one or more queries/requests to the presentation module 206 to override a data distribution session. A user associated with a work station 106 may log into the data distribution system 102 via the presentation module 206 to perform various functions similar to a user associated with the data distribution system 102.

The database module 212 may store and manage data and/or data identifier information associated with the data. The database module 212 may provide an interface, e.g., a uniform interface, for other modules within the data distribution system 102 and may write, read, and search data stored in one or more repositories or databases. The database module 212 may also perform other functions, such as, but not limited to, concurrent access, backup and archive functions. Due to limited amount of storing space the database module 212 may compress, store, transfer or discard data stored within, after a period of time, e.g., a year. The database module 210 may provide data associated with a data distribution session to the processing module 210. For example, the database module 210 may receive data identifier information from the processing module 210 and provide data associated with the data identifier information.

The database module 212 may be network accessible storage and may be local, remote, or a combination thereof to modules 206, 208, 210, 214, and/or 216. The database module 212 may utilize a redundant array of inexpensive disks (RAID), tape, disk, a storage area network (SAN), an internet small computer systems interface (iSCSI) SAN, a Fibre Channel SAN, a common Internet File System (CIFS), network attached storage (NAS), a network file system (NFS), or other computer accessible storage. In one or more embodiments, database module 212 may be a database, such as an Oracle® database, a Microsoft® SQL Server database, a DB2 database, a MySQL® database, a Sybase® database, an object oriented database, a hierarchical database, or other database. The database module 212 may utilize flat file structures for storage of data.

The work station list module 214 may provide a directory or list of the plurality of work stations 106(1-N). The work station list module 214 may store address information associated with the plurality of work stations 106(1-N). The work station list module 214 may format the address information of the plurality of work stations 106(1-N) into desired format. In an exemplary embodiment, the desired format for storing the address information associated with the plurality of work stations 106(1-N) may include tables, hash tables, search trees, matrix, spread sheets, models, array structure, linear representation, or other representations of the directory of address information of the plurality of work stations 106(1-N). For example, the work station list module 214 may include one or more databases to store a directory or list of address information associated with the plurality of work stations 106(1-N). In an exemplary embodiment, the processing module 210 may access the work station list module 214 to identify address information (e.g., uniform resource identifiers (URIs) or uniform resource locators (URLs), private electronic mail addresses, or other address information) associated with the work station 106.

The work station list module 214 may track a progress of data distribution to the plurality of work stations 106(1-N). In an exemplary embodiment, the processing module 210 may access the work station list module 214 to obtain address information associated with a work station 106 to distribute data to the work station 106. The processing module 210 may distribute data to one of the plurality of work stations 106(1-N) sequentially at a time. After completion of data distribution to a first work station 106, the processing module 210 may access the work station list module 214 to obtain address information associated with a second work station 106. The processing module 210 may repeat the data distribution to the second work station 106. The processing module 210 may continue to obtain address information associated with the plurality of work stations 106(1-N) until all the work stations 106(1-N) receive the distributed data. After distribution of data to the plurality of work stations 106(1-N), the processing module 210 may mark the data as being completely distributed and stored in or discarded from the database module 212.

In an exemplary embodiment, in the event that one or more work stations 106 is inactive and may not be available to receive the distributed data, the work station list module 214 may associate an indication pointer with the address information of the one or more inactive work stations 106. For example, the processing module 210 may search for indication pointers associated with the address information of the one or more inactive work stations 106. The work station list module 214 may provide the indication pointers associated with the address information of the one or more inactive work stations 106 to the processing module 210. In another exemplary embodiment, the work station list module 214 may move the address information associated with the one or more inactive work stations 106 at the end of the list of address information of the plurality of work stations 106 (1-N) to be re-accessed at a later time. In other exemplary embodiments, in the event that the first work station 106 is inactive, the processing module 210 may obtain address information associated with the next active work station 106 from the list of the plurality of work stations 106(1-N).

In another exemplary embodiment, during a data distribution session between a data distribution system 102 and one of the plurality of work stations 106(1-N), the work station 106 may become inactive (e.g., powered off or offline). The work station list module 214 may create an indication pointer associated with the address information of the inactive work station 106. The indication pointer created by the work station list module 214 may include information (e.g., percentage completed) associated a progress of data received when the work station 106 becomes inactive. Also, the indication pointer created by the work station list module 214 may include information associated with data that are not received during the data distribution session. The processing module 210 may reestablish a data distribution session with the inactive work station 106 to distribute missing data based at least in part on the indication pointer stored in the work station list module 214.

The data request queue module 216 may include database to store one or more data distribution requests from the plurality of work stations 106(1-N). In an exemplary embodiment, the plurality of work stations 106(1-N) may provide data distribution requests to the data distribution system 102. When no other data communication session is in progress or the data distribution system 102 is idle, the processing module 210 may process the data distribution requests to distribute data to the plurality of work stations 106(1-N). The data request queue module 216 may record the processed data distribution requests after the data distribution session to the work station 106. In an exemplary embodiment, the data request queue module 216 may discard the processed data distribution requests after a period of time (e.g., a month). When a data communication session is in progress, the data request queue module 216 may store the received data distribution requests from the one or more work stations 106. The data request queue module 216 may store the data distribution request in a sequential order (e.g., from earliest to the latest). The data request queue module 216 may provide the received data distribution requests to the processing module 210 upon the completion of the data distribution session or when the data distribution system 102 is idle.

In another exemplary embodiment, the processing module 210 may access the data request queue module 216 to search for data distribution requests. For example, the processing module 210 may access the data request queue module 216 after completion of the data distribution session. The processing module 210 may periodically access the data request queue module 216 to search for the data distribution requests. In another exemplary embodiment, the processing module 210 may access the data request queue module 216 to execute the data distribution requests until all the data distribution requests stored in the data request queue modules 216 are executed.

Figure 3:
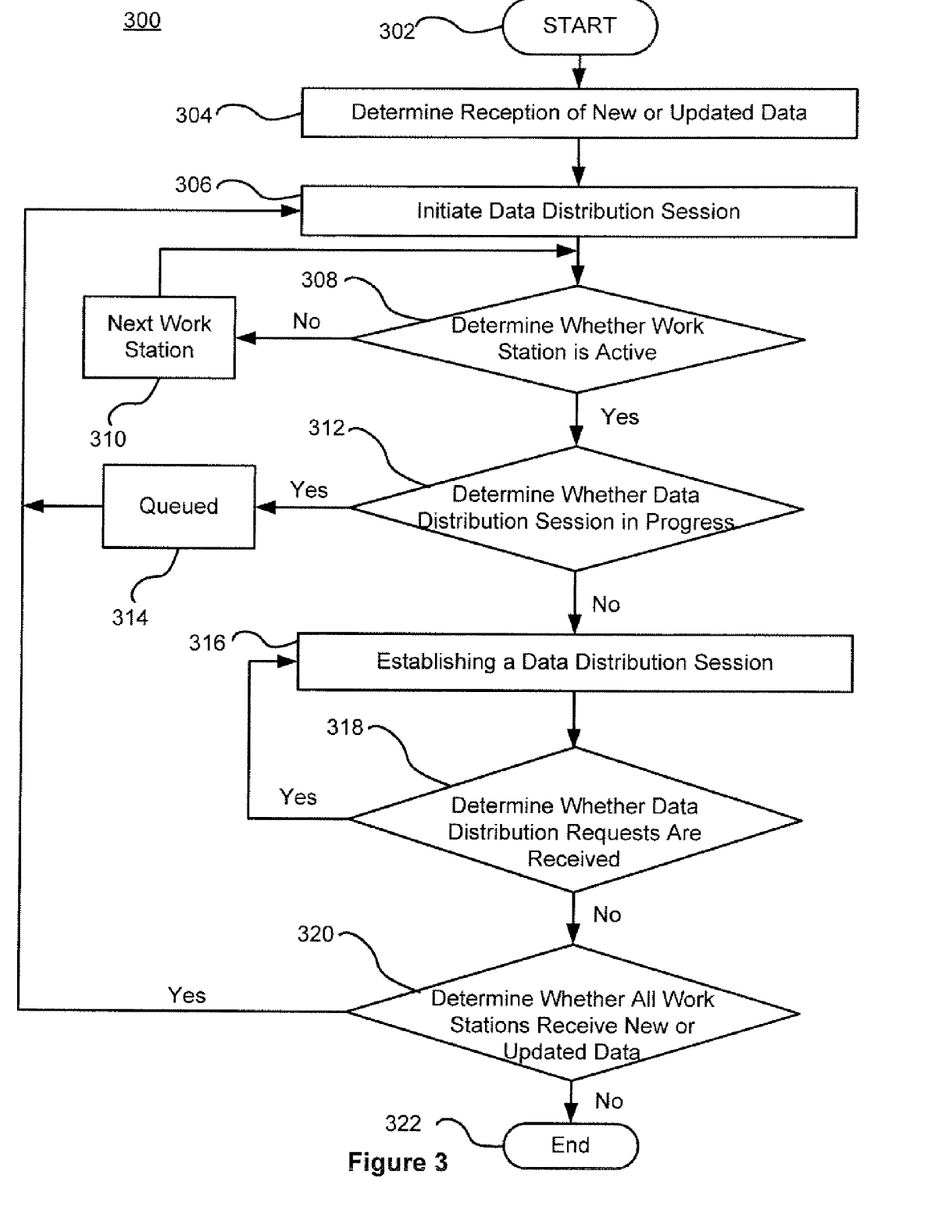
FIG. 3 is a flowchart illustrating the functionality for distributing data to a plurality of work stations according to a particular embodiment.

FIG. 3 is a flowchart illustrating the functionality for distributing data to a plurality of work stations according to a particular embodiment. This exemplary method 300 may be provided by way of example, as there are a variety of ways to carry out the method. The method 300 shown in FIG. 3 can be executed or otherwise performed by one or a combination of various systems. The method 300 is described below may be carried out by the system and network shown in FIGS. 1 and 2, by way of example, and various elements of the system and network are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 302, the method 300 for distributing data during a data distribution session may begin.

At block 304, the data distribution system 102 may determine reception of new or updated data. For example, the data distribution system 102 may receive new or updated data and stored. The data distribution system 102 may periodically determine whether new or updated data are received and stored. In an exemplary embodiment, the data distribution system 102 may determine whether new or updated data are received and stored every half hour. In another exemplary embodiment, the data distribution system 102 may determine whether the new or updated data are received every day. After determining the reception of new or updated data at the data distribution system 102, the method 300 may proceed to block 306.

At block 306, the data distribution system 102 may initiate a data distribution session. For example, the data distribution system 102 may obtain address information from a directory or list of the plurality of work stations 106(1-N). In an exemplary embodiment, the data distribution system 102 may obtain address information associated with a first work station 106 from the directory or list of the plurality of work stations 106(1-N). in an exemplary embodiment, the data distribution system 102 may obtain address information associated with a work station 106 that may be located (e.g., geographically) closest to the data distribution system 102 from the directory or list of the plurality of work stations 106(1-N). After initiating a data distribution session, the method 300 may proceed to block 308.

At block 308, the data distribution system 102 may determine whether the work station 106 is active. For example, the data distribution system 102 may transmit a data distribution session request to the work station 106 based at least in part on the address information obtained from the directory or list of the plurality of work stations 106(1-N). The work station 106 may process the data distribution session request and transmit the processed data distribution session request back to the data distribution system 102. For example, the data distribution system 102 may determine that the work station 106 is active when receiving the processed data distribution session request back from the work station 106. The data distribution system 102 may determine that the work station 106 is inactive when not receiving the processed data distribution session request back from the work station 106. After determination of whether the work station 106 is active, the method 300 may proceed to block 310 when the work station 106 is inactive or the method 300 may proceed to block 312 when the work station 106 is active.

At block 310, when the work station 106 is inactive, the data distribution system 102 may obtain address information associated with the next work station 106 in the directory or list of the plurality of work stations 106(1-N). In an exemplary embodiment, the data distribution system 102 may obtain address information associated with the second work station 106 in the directory or list of the plurality of work stations 106(1-N). In another exemplary embodiment, the data distribution system 102 may obtain address information associated with the second (e.g., geographically) closest work station 106 to the data distribution system 102 from the directory or list of the plurality of work stations 106(1-N). After obtaining the address information associated with the next work station 106 in the directory or list of the plurality of work stations 1061-N), the method 300 may proceed back to block 308 to again determine whether the next work station 106 is active.

At block 312, the data distribution system 102 may determine whether a data distribution session is in progress. The data distribution system 102 may allow a single data distribution session to one work station 106 at one time. For example, the data distribution system 102 may determine whether data are being transmitted to another work station 106. In the event that another data distribution session is in progress, the method 300 may proceed to block 314. In the event that no other data distribution session is in progress, the method 300 may proceed to block 316.

At block 314, the data distribution system 102 may queue the data distribution session when another data distribution session is in progress. For example, the data distribution system 102 may reinitiate the data distribution session when the other data distribution session is completed. In another exemplary embodiment, the data distribution system 102 may reinitiate the data distribution session when the data distribution system 102 is idle (e.g., not distributing data).

At block 316, the data distribution system 102 may establish a data distribution session when no other data distribution session is in progress. For example, the data distribution system 102 may distribute data to the work station 106 during the data distribution session. In an exemplary embodiment, the data distribution system 102 may create a temporary storage location (e.g., temporary folder) at the work station 106 to store the data during the data distribution session. The data distribution system 102 may instruct the data stored in the temporary storage location to be installed at the work station 106. In another exemplary embodiment, the data stored at the temporary storage location of the work station 106 may be automatically installed onto the work station 106. After completion of the data distribution session to the work station 106, the method may proceed to block 318.

At block 318, the data distribution system 102 may determine whether data distribution requests are received from the plurality of work stations 106(1-N). In an exemplary embodiment, in the event that no data distribution requests are received from the plurality of work stations 106(1-N), the method 300 may proceed to block 320, where the data distribution system 102 may determine whether each of the plurality of work stations 106(1-N) has received the new or updated data. In another exemplary embodiment, in the event that one or more data distribution requests are received from the plurality of work stations 106(1-N), the data distribution system 102 may establish a data distribution session with the requesting work station 106 before proceeding to distribute the new or updated data to the next active work station 106 in the directory or list of the plurality of work stations 106(1-N). For example, the method 300 may proceed back to block 316, where the data distribution system 102 may obtain an address information from the data distribution request to establish a data distribution session with the requesting work station 106.

At block 320, the data distribution system 102 determines whether the new or updated data have been transmitted to each of the plurality of work stations 106(1-N). For example, the data distribution system 102 may verify whether additional address information associated with the plurality of work stations 106(1-N) may not receive the new or updated data. In the event that one or more work stations 106 may not receive the new or updated data, the data distribution system 102 may access the directory or list of the plurality of work stations 106(1-N) to obtain address information associated with the one or more work stations 106 that may not receive the new or updated data. The method 300 may proceed back to block 306. In the event that the all work stations 106 may receive the new or update data from the data distribution system 102, the method 300 may proceed to block 322.

At block 322, the method 300 may end.

Figure 4:
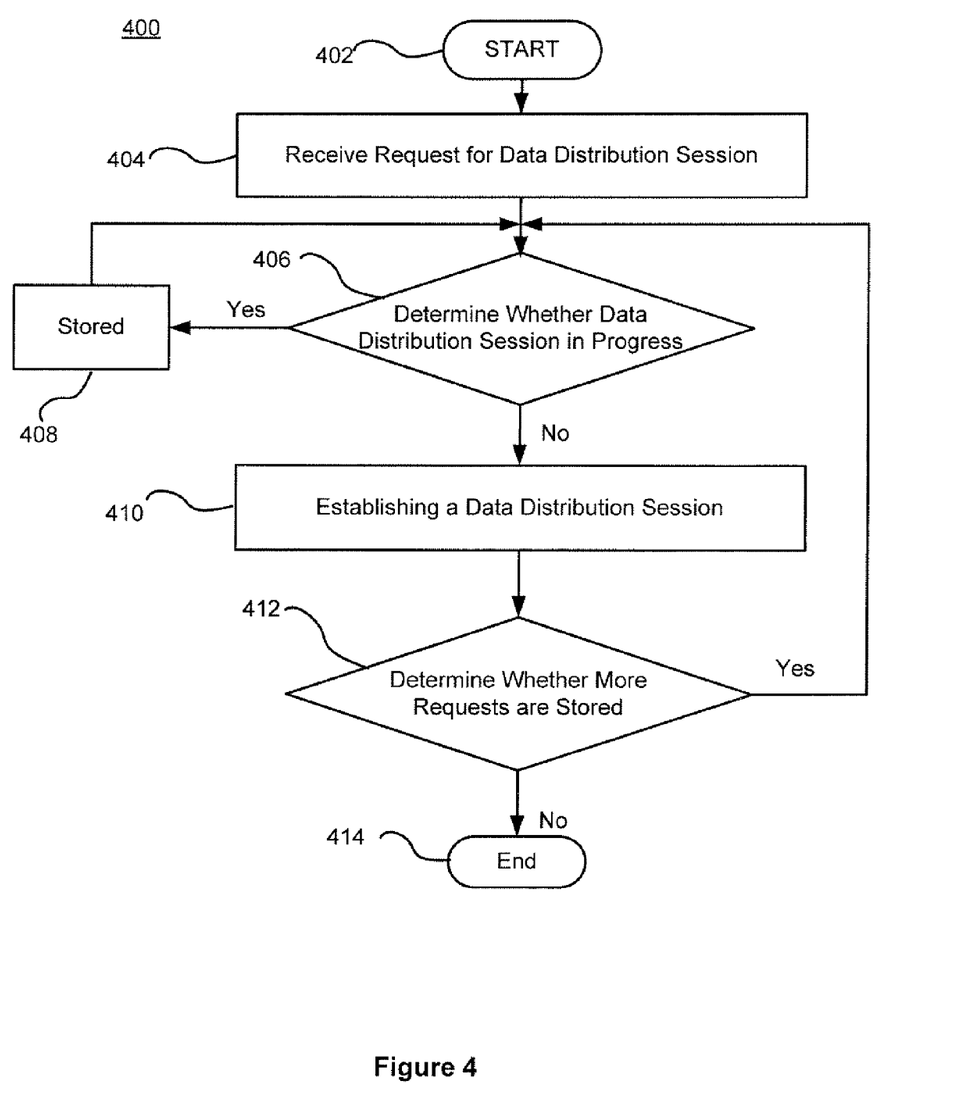
FIG. 4 is a flowchart illustrating the functionality for distributing data to a plurality of work stations according to another particular embodiment.

FIG. 4 is a flowchart illustrating the functionality for distributing data to a plurality of work stations according to another particular embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the system and network shown in FIGS. 1 and 2, by way of example, and various elements of the system and network are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, the method 400 for distributing data during a data distribution session may begin.

At block 404, the data distribution system 102 may receive one or more data distribution requests from the plurality of work stations 106(1-N). For example, a work station 106 may compare data maintained at the work station 106 and the data maintained at the data distribution system 102. In the event that the data distribution system 102 may maintain data not maintained at the work station 106. The work station 106 may transmit one or more data distribution requests to the data distribution system 102. For example, the data distribution requests may include data identifier information associated with the data maintained at the data distribution system 102 and not maintained by the work station 106. The data distribution requests may also include address information associated with the work station 106.

In another exemplary embodiment, the work station 106 may transmit one or more data probing requests back to the data distribution system 102. For example, the data distribution system 102 may generate one or more data probing requests for the plurality of work stations 106(1-N). The one or more data probing requests may include data identifier information associated with data maintained at the data distribution system 102. The plurality of work stations 106(1-N) may process the one or more data probing requests. For example, the work station 106 may compare data maintained at the data distribution system 102 based on the data probing requests with data maintained at the work station 106. The work station 106 may include data identifier information associated with data maintained at the data distribution system 102 and not at the work station 106 into the data probing requests. Subsequently, the plurality of work stations 106(1-N) may transmit the one or more processed data probing requests back to the data distribution system 102.

In another exemplary embodiment, the work station 106 may include data identifier information associated with data maintained at the work station 106 to the one or more data probing requests. The work station 106 may transmit the one or more data probing requests back to the data distribution system 102. The data distribution system 102 may determine whether data maintained at the plurality of work stations 106(1-N) require update based at least in part on the one or more processed data probing requests. For example, the data distribution system 102 may determine whether the work station 106 maintained the most recent data by comparing the data maintained at the work station 106 with data stored in the data distribution system 102 based on the data identifier information associated with data maintained at the work station 106. After receiving data distribution requests, the method 400 may proceed to block 406.

At block 406, the data distribution system 102 may determine whether a data distribution session is in progress. The data distribution system 102 may allow a single data distribution session at one time. For example, the data distribution system 102 may determine whether data are transmitted to another work station 106. In the event that another data distribution session is in progress, the method 400 may proceed to block 408. In the event that no other data distribution session is in progress, the method 400 may proceed to block 410.

At block 408, the data distribution system 102 may store the data distribution requests when another data distribution session is in progress. The data distribution system 102 may store the data distribution request in a data request queue database. For example, the data distribution system 102 may store the data distribution request in a sequential order (e.g., earliest received to latest received). The data distribution system 102 may reinitiate the data distribution requests when the other data distribution session is completed. In another exemplary embodiment, the data distribution system 102 may reinitiate the data distribution session when the data distribution system 102 is idle (e.g., not distributing data).

At block 410, the data distribution system 102 may establish a data distribution session when no other data distribution session is in progress. For example, the data distribution system 102 may distribute data to the work station 106 during the data distribution session. In an exemplary embodiment, the data distribution system 102 may create a temporary storage location (e.g., temporary folder) at the work station 106 to store the data during the data distribution session. The data distribution system 102 may instruct the data stored in the temporary storage location to be installed at the work station 106. In another exemplary embodiment, the data stored in the temporary storage location of the work station 106 may automatically install onto the work station 106. After completion of the data distribution session to the work station 106, the method 400 may proceed to block 412.

At block 412, the data distribution system 102 determines whether other data distribution requests are stored in the data request queue database. For example, the data distribution system 102 may verify whether additional data requests are stored in the data request queue database. In the event that one or more data requests are stored in the data request queue database, the data distribution system 102 may access the data request queue database to obtain execute the data requests. The method 400 may proceed back to block 406. In the event that the no more data requests are stored in the data request queue database, the method 400 may proceed to block 414.

At block 414, the method 400 may end.

Figure 5:
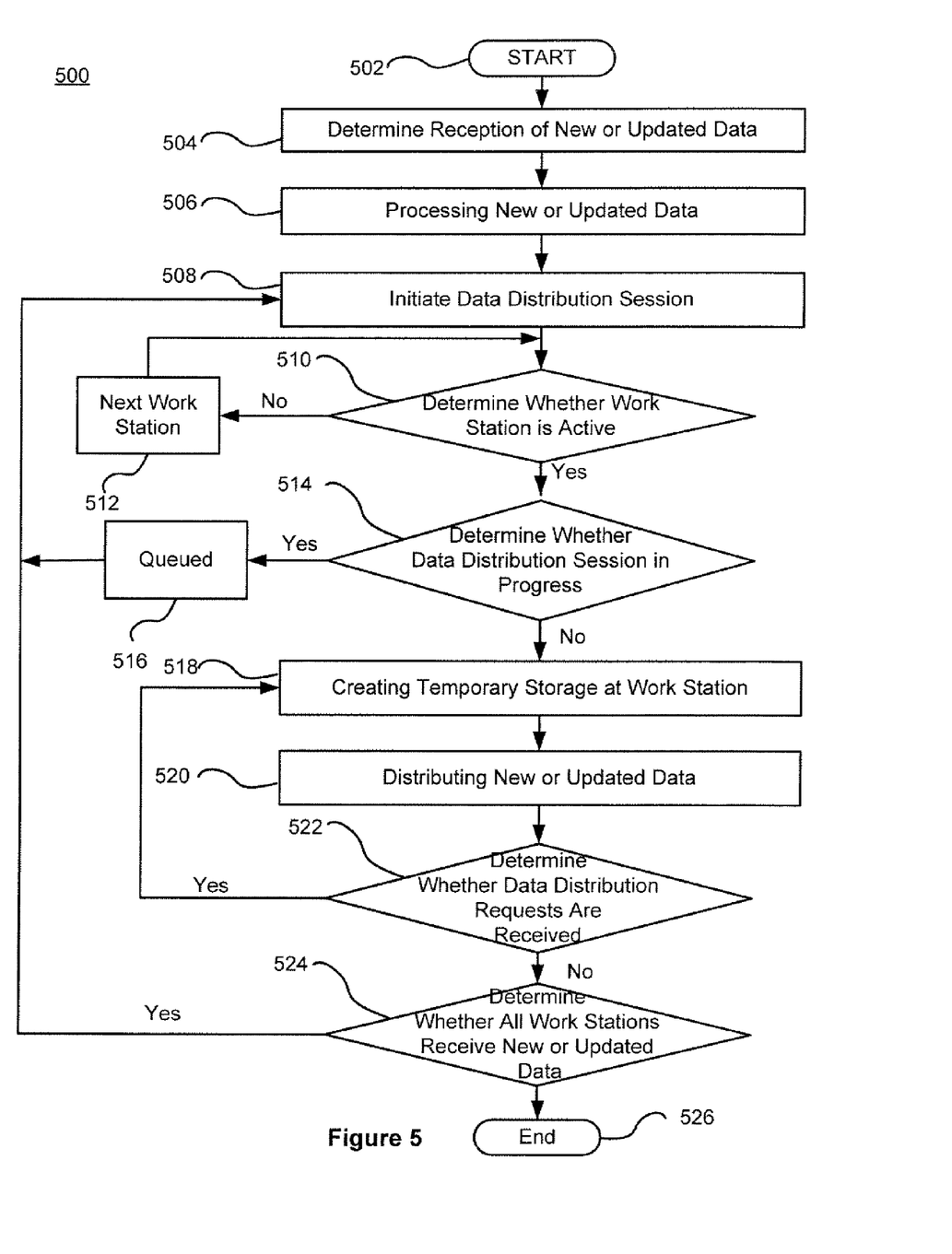
FIG. 5 is a flowchart illustrating the functionality for distributing data to a plurality of work stations according to a particular embodiment.

FIG. 5 is a flowchart illustrating the functionality for distributing data to a plurality of work stations according to a particular embodiment. This exemplary method 500 may be provided by way of example, as there are a variety of ways to carry out the method. The method 500 shown in FIG. 5 can be executed or otherwise performed by one or a combination of various systems. The method 500 is described below may be carried out by the system and network shown in FIGS. 1 and 2, by way of example, and various elements of the system and network are referenced in explaining the example method of FIG. 5. Each block shown in FIG. 5 represents one or more processes, methods or subroutines carried out in exemplary method 500. Referring to FIG. 5, exemplary method 500 may begin at block 502.

At block 502, the method 500 for distributing data during a data distribution session may begin.

At block 504, the data distribution system 102 may determine reception of new or updated data. For example, the data distribution system 102 may receive new or updated data and stored. The data distribution system 102 may periodically determine whether new or updated data are received and stored. In an exemplary embodiment, the data distribution system 102 may determine whether new or updated data are received and stored every half hour. In another exemplary embodiment, the data distribution system 102 may determine whether the new or updated data are received every day. After determining the reception of new or updated data at the data distribution system 102, the method 500 may proceed to block 506.

At block 506, the data distribution system 102 may process the new or updated data. For example, the data distribution system 102 may zip the new or updated data for distribution over the communication network 104. The data distribution system 102 may filter the new or updated data and eliminating erroneous or defective new or updated data. The data distribution system 102 may sort the new or updated data in accordance with the urgency of distributing the new or updated data. In another exemplary embodiment, the data distribution system 102 may format the new or updated data into desired format. After processing the new or updated data at the data distribution system 102, the method 500 may proceed to block 508.

At block 508, the data distribution system 102 may initiate a data distribution session. For example, the data distribution system 102 may obtain address information from a directory or list of the plurality of work stations 106(1-N). In an exemplary embodiment, the data distribution system 102 may obtain address information associated with a first work station 106 from the directory or list of the plurality of work stations 106(1-N). In an exemplary embodiment, the data distribution system 102 may obtain address information associated with a work station 106 that may be located (e.g., geographically) closest to the data distribution system 102 from the directory or list of the plurality of work stations 106(1-N). After initiating a data distribution session, the method 500 may proceed to block 510.

At block 510, the data distribution system 102 may determine whether the work station 106 is active. For example, the data distribution system 102 may transmit a data distribution session request to the work station 106 based at least in part on the address information obtained from the directory or list of the plurality of work stations 106(1-N). The work station 106 may process the data distribution session request and transmit the processed data distribution session request back to the data distribution system 102. For example, the data distribution system 102 may determine that the work station 106 is active when receiving the processed data distribution session request back from the work station 106. The data distribution system 102 may determine that the work station 106 is inactive when not receiving the processed data distribution session request back from the work station 106. After determination of whether the work station 106 is active, the method 500 may proceed to block 512 when the work station 106 is inactive or the method 500 may proceed to block 514 when the work station 106 is active.

At block 512, when the work station 106 is inactive, the data distribution system 102 may obtain address information associated with the next work station 106 in the directory or list of the plurality of work stations 106(1-N). In an exemplary embodiment, the data distribution system 102 may obtain address information associated with the second work station 106 in the directory or list of the plurality of work stations 106(1-N). In another exemplary embodiment, the data distribution system 102 may obtain address information associated with the second (e.g., geographically) closest work station 106 to the data distribution system 102 from the directory or list of the plurality of work stations 106(1-N). After obtaining the address information associated with the next work station 106 in the directory or list of the plurality of work stations 1061-N), the method 500 may proceed back to block 510 to again determine whether the next work station 106 is active.

At block 514, the data distribution system 102 may determine whether a data distribution session is in progress. The data distribution system 102 may allow a single data distribution session to one work station 106 at one time. For example, the data distribution system 102 may determine whether data are being transmitted to another work station 106. In the event that another data distribution session is in progress, the method 500 may proceed to block 516. In the event that no other data distribution session is in progress, the method 500 may proceed to block 518.

At block 516, the data distribution system 102 may terminate the data distribution session when another data distribution session is in progress. For example, the data distribution system 102 may reinitiate the data distribution session when the other data distribution session is completed. In another exemplary embodiment, the data distribution system 102 may reinitiate the data distribution session when the data distribution system 102 is idle (e.g., not distributing data).

At block 518, the data distribution system 102 may create a temporary storage location at the work station 106. In an exemplary embodiment, the data distribution system 102 may create a temporary storage location (e.g., temporary folder) at the work station 106 to store the new or updated data during a data distribution session. In another exemplary embodiment, the work station 106 may create a temporary storage location (e.g., temporary folder) to receive the new or updated data during a data distribution session. After creating a temporary storage location at the work station 106, the method may proceed to block 520.

At block 520, the data distribution system 102 may distribute the new or updated data to a work station 106. In another exemplary embodiment, the data distribution system 102 may instruct the zipped new or updated data to be stored in the temporary storage location at the work station 106. Also, the data distribution system 102 may transmit data (e.g., Upload Complete File or Upload Complete Message), upon completion of distribution of the zipped new or updated data, to the temporary storage location at the work station 106 to indicate that the distribution session is completed. In another exemplary embodiment, the new or updated data stored at the temporary storage location of the work station 106 may be automatically installed onto the work station 106. After distributing the new or updated data to the work station 106, the method 500 may proceed to block 522.

At block 522, the data distribution system 102 may determine whether data distribution requests are received from the plurality of work stations 106(1-N). In an exemplary embodiment, in the event that no data distribution requests are received from the plurality of work stations 106(1-N), the method 500 may proceed to block 524, where the data distribution system 102 may determine whether each of the plurality of work stations 106(1-N) has received the new or updated data. In another exemplary embodiment, in the event that one or more data distribution requests are received from the plurality of work stations 106(1-N), the data distribution system 102 may establish a data distribution session with the requesting work station 106 before proceeding to distribute the new or updated data to the next active work station 106 in the directory or list of the plurality of work stations 106(1-N). For example, the method 500 may proceed back to block 518, where the data distribution system 102 may create a temporary storage location (e.g., temporary folder) at the requesting work station 106 to establish a data distribution session with the requesting work station 106.

At block 524, the data distribution system 102 determines whether the new or updated data have been transmitted to each of the plurality of work stations 106(1-N). For example, the data distribution system 102 may verify whether additional address information associated with the plurality of work stations 106(1-N) may not receive the new or updated data. In the event that one or more work stations 106 may not receive the new or updated data, the data distribution system 102 may access the directory or list of the plurality of work stations 106(1-N) to obtain address information associated with the one or more work stations 106 that may not receive the new or updated data. The method 500 may proceed back to block 508. In the event that the all work stations 106 may receive the new or update data from the data distribution system 102, the method 500 may proceed to block 526.

At block 526, the method 500 may end.

Figure 6:
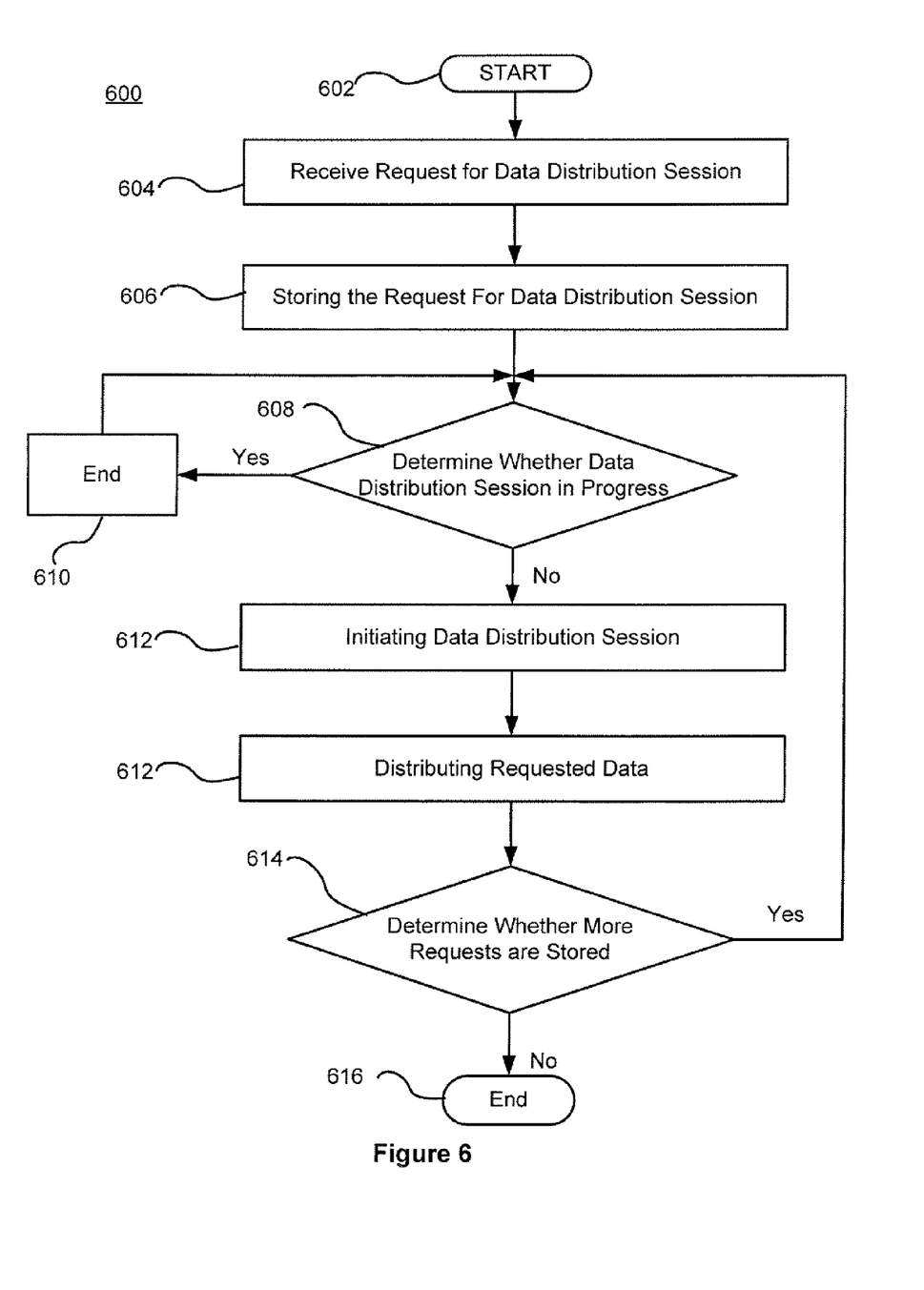
FIG. 6 is a flowchart illustrating the functionality for distributing data to a plurality of work stations according to another particular embodiment.

FIG. 6 is a flowchart illustrating the functionality for distributing data to a plurality of work stations according to another particular embodiment. This exemplary method 600 may be provided by way of example, as there are a variety of ways to carry out the method. The method 600 shown in FIG. 6 can be executed or otherwise performed by one or a combination of various systems. The method 600 is described below may be carried out by the system and network shown in FIGS. 1 and 2, by way of example, and various elements of the system and network are referenced in explaining the example method of FIG. 6. Each block shown in FIG. 6 represents one or more processes, methods or subroutines carried out in exemplary method 600. Referring to FIG. 6, exemplary method 600 may begin at block 602.

At block 602, the method 600 for distributing data during a data distribution session may begin.

At block 604, the data distribution system 102 may receive one or more data distribution requests from the plurality of work stations 106(1-N). For example, a work station 106 may compare data maintained at the work station 106 and the data maintained at the data distribution system 102. In the event that the data distribution system 102 may maintain data not maintained at the work station 106. The work station 106 may transmit one or more data distribution requests to the data distribution system 102. For example, the data distribution requests may include data identifier information associated with the data maintained at the data distribution system 102 and not maintained by the work station 106. The data distribution requests may also include address information associated with the work station 106.

In another exemplary embodiment, the work station 106 may transmit one or more data probing requests back to the data distribution system 102. For example, the data distribution system 102 may generate one or more data probing requests for the plurality of work stations 106(1-N). The one or more data probing requests may include data identifier information associated with data maintained at the data distribution system 102. The plurality of work stations 106(1-N) may process the one or more data probing requests. For example, the work station 106 may compare data maintained at the data distribution system 102 based on the data probing requests with data maintained at the work station 106. The work station 106 may include data identifier information associated with data maintained at the data distribution system 102 and not at the work station 106 into the data probing requests. Subsequently, the plurality of work stations 106(1-N) may transmit the one or more processed data probing requests back to the data distribution system 102.

In another exemplary embodiment, the work station 106 may include data identifier information associated with data maintained at the work station 106 to the one or more data probing requests. The work station 106 may transmit the one or more data probing requests back to the data distribution system 102. The data distribution system 102 may determine whether data maintained at the plurality of work stations 106(1-N) require update based at least in part on the one or more processed data probing requests. For example, the data distribution system 102 may determine whether the work station 106 maintained the most recent data by comparing the data maintained at the work station 106 with data stored in the data distribution system 102 based on the data identifier information associated with data maintained at the work station 106. After receiving data distribution requests, the method 600 may proceed to block 606.

At block 606, the data distribution system 102 may store the data distribution requests. For example, the data distribution system 102 may store the data distribution requests in a data request queue database. The data distribution system 102 may initiate a data distribution session based at least in part on the data distribution requests received from a plurality of work stations 106(1-N). After storing the data distribution requests at the data distribution requests, the method 600 may proceed to block 608.

At block 608, the data distribution system 102 may determine whether a data distribution session is in progress. The data distribution system 102 may allow a single data distribution session at one time. For example, the data distribution system 102 may determine whether data are transmitted to another work station 106. In the event that another data distribution session is in progress, the method 600 may proceed to block 610. In the event that no other data distribution session is in progress, the method may proceed 600 to block 612.

At block 610, the data distribution system 102 may end the data distribution session when another data distribution session is in progress. The data distribution system 102 may store the data distribution request in a data request queue database. For example, the data distribution system 102 may store the data distribution request in a sequential order (e.g., earliest received to latest received). The data distribution system 102 may reinitiate the data distribution requests when the other data distribution session is completed. In another exemplary embodiment, the data distribution system 102 may reinitiate the data distribution session when the data distribution system 102 is idle (e.g., not distributing data).

At block 612, the data distribution system 102 may initiate a data distribution session based on the data distribution requests. For example, the data distribution system 102 may obtain address information of a data distribution request from the data request queue database. In an exemplary embodiment, the data distribution system 102 may obtain address information associated with a work station 106 of the first data distribution request from the data request queue database. In another exemplary embodiment, the data distribution system 102 may obtain data identifier information of a first data distribution request from the data request queue database. In an exemplary embodiment, the data distribution system 102 may obtain address information of a data distribution request associated with a work station 106 that may be located (e.g., geographically) closest to the data distribution system 102 from the data request queue database. After initiating a data distribution session, the method 600 may proceed to block 612.

At block 612, the data distribution system 102 may distribute data to a work station 106 during a data distribution session when no other data distribution session is in progress. For example, the data distribution system 102 may distribute data to the work station 106 during the data distribution session. In an exemplary embodiment, the data distribution system 102 may create a temporary storage location (e.g., temporary folder) at the work station 106 to store the data during the data distribution session. In another exemplary embodiment, the data distribution system 102 may provide data (e.g., Upload Complete File or Upload Complete Message), upon completion of distribution of the requested data, to the temporary storage location at the work station 106 to indicate that the distribution session is completed. The data distribution system 102 may instruct the data stored in the temporary storage location to be installed at the work station 106. In another exemplary embodiment, the data stored in the temporary storage location of the work station 106 may automatically install onto the work station 106. After completion of the data distribution session to the work station 106, the method 600 may proceed to block 614.

At block 614, the data distribution system 102 determines whether other data distribution requests are stored in the data request queue database. For example, the data distribution system 102 may verify whether additional data requests are stored in the data request queue database. In the event that one or more data requests are stored in the data request queue database, the data distribution system 102 may access the data request queue database to obtain execute the data requests. The method 600 may proceed back to block 608. In the event that the no more data requests are stored in the data request queue database, the method 600 may proceed to block 616.

At block 616, the method 600 may end.

The description above describes a data distribution system, a communication network, a plurality of work stations having network elements, storage devices, various networks, and other elements for coupling user via the communication network, some of which are explicitly depicted, others of which are not. As used herein, the term "module" may be understood to refer to executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

I claim:

1. A method, comprising:

determining, via a processor, reception of new or updated data;

initiating, via the processor, a first data distribution session to distribute the new or updated data to a first work station of a plurality of work stations via a communication network;

determining, via the processor, whether the first work station of the plurality of work stations is available to receive the new or updated data;

determining, via the processor, whether a second data distribution session is in progress;

establishing, via the processor, the first data distribution session with the first work station of the plurality of work stations via the communication network in response to a determination that the second data distribution session is not in progress, and upon determination that the second data distribution session is in progress, queuing, via the processor, the first data distribution session with the first work station of the plurality of work stations, wherein the new or updated data is distributed sequentially among the plurality of work stations one at a time during different data distribution sessions in order to ensure sufficient bandwidth and processing power for other applications at the plurality of work stations.

2. The method of claim 1, further comprising periodically determining the reception of the new or updated data.

3. The method of claim 1, wherein initiating a first data distribution session comprises obtaining address information associated with the first work station of the plurality of work stations.

4. The method of claim 3, further comprises obtaining address information associated with a second work station of the plurality of work stations in response to the determination that the first work station of the plurality of work stations is unavailable to receive the new or updated data.

5. The method of claim 4, further comprises determining whether the second work station of the plurality of work stations is available to receive the new or updated data.

6. The method of claim 1, further comprises terminating the first data distribution session in response to the determination that the second data distribution session is in progress.

7. The method of claim 1, wherein establishing the first data distribution session with the first work station of the plurality of work stations comprises transmitting the new or updated data to a temporary storage location at the first work station.

8. The method of claim 1, further comprises determining whether the new or updated data are distributed to the plurality of work stations.

9. The method of claim 1, wherein the determining, via the processor, whether a second data distribution session is in progress comprises the processor determining whether the second data distribution session is in progress at any work station, other than the first work station, of the plurality of work stations.

10. The method of claim 1, further comprising allowing only a single data distribution session to be established at one time among the plurality of work stations.

11. A method, comprising:
receiving a first data distribution request for a first data distribution session from a first work station of a plurality of work stations via a communication network;
determining, via a processor, whether a second data distribution session is in progress;
establishing, via the processor, the first data distribution session with the first work station of the plurality of work stations via the communication network in response to a determination that the second data distribution session is not in progress,
upon a determination that the second data distribution session is in progress, storing the first data distribution request in a data request queue database, and
sequentially distributing new or updated data among the plurality of work stations one at a time during different data distribution sessions in order to ensure sufficient bandwidth and processing power for other applications at the plurality of work stations.

12. The method of claim 11, wherein receiving a first data distribution request for a first data distribution session comprises transmitting one or more data probing requests to the first work station of the plurality of work stations.

13. The method of claim 11, wherein the first data distribution request comprises address information associated with the first work station of the plurality of work stations.

14. The method of claim 11, wherein the first data distribution request comprises data identifier information associated with data maintained at a data distribution system and not maintained at the first work station of the plurality of work stations.

15. The method of claim 11, wherein the first data distribution request comprises data identifier information associated with data maintained at the first work station of the plurality of work stations.

16. The method of claim 15, further comprises comparing the data identifier information associated with data maintained at the first work station of the plurality of work stations with data identifier information associated with data maintained at a data distribution system.

17. The method of claim 11, further comprises re-accessing the first data distribution request stored in the data request queue after completion of the second data distribution session.

18. The method of claim 11, further comprises determining whether a second data distribution request is stored in the data request queue.

19. The method of claim 11, wherein establishing the first data distribution session with the first work station of the plurality of work stations comprises transmitting data to the first work station of the plurality of work stations based at least in part on the first data distribution request.

20. The method of claim 11, further comprising:
receiving a plurality of data distribution requests from the plurality of workstations, including the first data distribution request for a first data distribution session; and
preprocessing, via the processer, the plurality of data distribution requests to optimize data distribution to the requesting plurality of workstations, the preprocessing including at least one of the set consisting of filtering, sorting, formatting, and aggregating the plurality of data distribution requests.

21. The method of claim 20, wherein the filtering comprises eliminating erroneous or defective data distribution requests.

22. A system, comprising:
a database module configured to store new or updated data;
a work station list module configured to store address information associated with a plurality of work stations;
a processing module configured to obtain address information associated with a first work station of the plurality of work stations to initiate a first data distribution session and determine whether another data distribution session is in progress;
an input/output module configured to transmit the new or updated data to the first work station of the plurality of work stations in response to the determination that the other data distribution session is not in progress; and
a data request queue module configured to store data distribution requests in response to the determination that the other data distribution session is in progress,
wherein the new or updated data is distributed sequentially among the plurality of work stations one at a time during different data distribution sessions in order to ensure sufficient bandwidth and processing power for other applications at the plurality of work stations.

23. The system of claim 22, wherein the processing module is further configured to determine whether the first work station of the plurality of work stations is available to receive the new or updated data.

24. The system of claim 22, further comprises a presentation module configured to receive one or more requests from a user associated with the first work station.

25. The system of claim 22, wherein the processing module is further configured to generate one or more data probing requests having data identifier information associated with data maintained at a data distribution system.

26. The system of claim 22, wherein the input/output module is further configured to sequentially distribute the new or updated data among the plurality of work stations one at a time during different data distribution sessions in order to ensure sufficient bandwidth and processing power for other applications at the plurality of work stations.

* * * * *